United States Patent
Zhang et al.

(10) Patent No.: US 9,897,726 B2
(45) Date of Patent: Feb. 20, 2018

(54) COLOR FILTER SUBSTRATE AND DISPLAY PANEL USING SAME

(71) Applicant: Century Technology (Shenzhen) Corporation Limited, Shenzhen (CN)

(72) Inventors: Yue Zhang, Shenzhen (CN); Min Hu, Shenzhen (CN); Chen-Fu Mai, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 336 days.

(21) Appl. No.: 14/752,214

(22) Filed: Jun. 26, 2015

(65) Prior Publication Data

US 2016/0077252 A1    Mar. 17, 2016

(30) Foreign Application Priority Data

Sep. 12, 2014    (CN) .......................... 2014 1 0463387

(51) Int. Cl.
  *G02F 1/1335*    (2006.01)
  *G02B 5/20*    (2006.01)
  *G02F 1/1368*    (2006.01)
  *G02B 5/00*    (2006.01)

(52) U.S. Cl.
  CPC ............. *G02B 5/201* (2013.01); *G02B 5/003* (2013.01); *G02F 1/1368* (2013.01); *G02F 1/133512* (2013.01); *G02F 1/133514* (2013.01)

(58) Field of Classification Search
  None
  See application file for complete search history.

(56) References Cited

U.S. PATENT DOCUMENTS 7,133,100 B2 *  11/2006  Ahn ................... H01L 21/31058
                                                                    257/E21.242
2005/0117094 A1 *  6/2005  Kim ................... G02F 1/133512
                                                                    349/110

* cited by examiner

*Primary Examiner* — Richard Kim
(74) *Attorney, Agent, or Firm* — ScienBiziP, P.C.

(57) ABSTRACT

A color filter substrate includes a substrate, a barrier layer located on the substrate; and a plurality of color filtering units and a plurality of black matrixes located on the barrier layer. The barrier layer includes a plurality of first portions respectively corresponding with the plurality of color filtering units and a plurality of second portions respectively corresponding with the plurality of black matrixes. Each of the second portions defines at least one groove. Each of black matrixes comprises at least one protrusion received in the at least one groove of a corresponding second portion and a base coupled with the at least one protrusion.

20 Claims, 10 Drawing Sheets

COLOR FILTER SUBSTRATE AND DISPLAY PANEL USING SAME

CROSS-REFERENCE TO RELATED APPLICATIONS

This application claims priority to Chinese Patent Application No. 201410463387.4 filed on Sep. 12, 2014, the contents of which are incorporated by reference herein.

FIELD

The subject matter herein generally relates to a color filter substrate utilized in a display panel.

BACKGROUND

Liquid crystal display (LCD) devices, such as thin film transistor liquid crystal display (TFT-LCD) panel and organic light emitting diode (OLED) display panel, are widely used, because their small size, light weight, low radiation, low power cost, and full-color display. Generally, an LCD panel can include a color filter substrate, a TFT array substrate, and a liquid crystal layer between the color filter substrate and the TFT array substrate. The color filter substrate usually includes a number of black matrixes and a number of filtering units formed on a substrate. The black matrix is located between two adjacent filtering units to separate the two adjacent filtering units, to increase the color contrast of the LCD panel. Oblique lights will be produced within the liquid crystal layer due to irregularly rotation of liquid crystals in the liquid crystal layer, which may cause light leakage issues at the oblique viewing angle.

BRIEF DESCRIPTION OF THE DRAWINGS

Implementations of the present technology will now be described, by way of example only, with reference to the attached figures.

DETAILED DESCRIPTION

Figure 1:
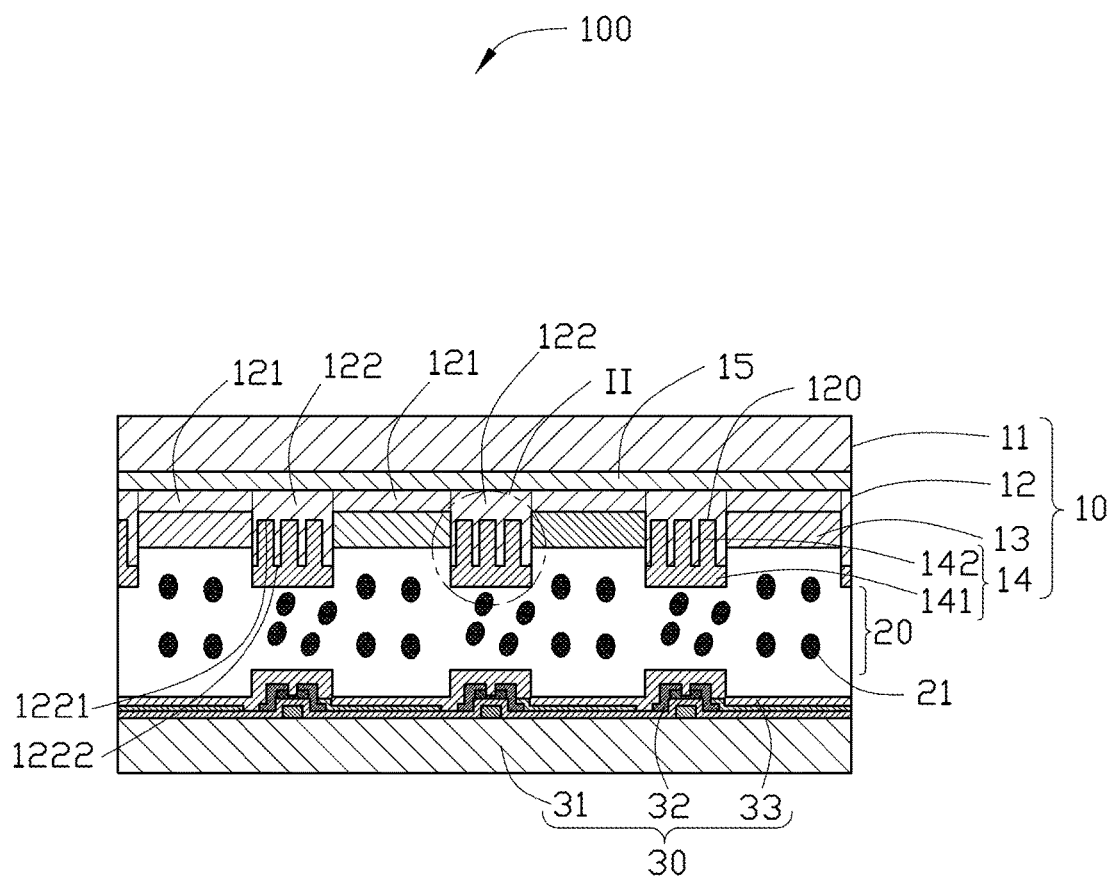
FIG. 1 illustrates a cross-sectional view of a display panel according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "comprising", when utilized, means "including, but not necessarily limited to"; it specifically indicates open-ended inclusion or membership in the so-described combination, group, series and the like.

The present disclosure is described in relation to a color filter substrate of a display panel.

FIG. 1 illustrates a cross-sectional view of a display panel 100. In at least one embodiment, the display panel can be a thin film transistor liquid crystal display (TFT-LCD) panel. The display panel 100 includes a color filter substrate 10, a liquid crystal layer 20, and an array substrate 30. The liquid crystal layer 20 includes a plurality of regularly arranged or irregularly arranged liquid crystals 21 and is located between the color filter substrate 10 and the array substrate 30. The color filter substrate 10 includes a first substrate 11 and a color filter (not labeled) located at a side of the first substrate 10 adjacent to the liquid crystal layer 20.

The array substrate 30 includes a second substrate 31, a plurality of TFTs 32, and a plurality of pixel electrodes 33 formed on the second substrate 31. Each pixel electrode 33 is coupled with a corresponding TFT 32. In this embodiment, the display panel 100 further includes a common electrode layer 15 located between the first substrate 11 and the color filter. In other embodiments, the common electrode layer 15 can be located at other position. For example, the common electrode layer 15 can also be located between the color filter and the liquid crystal layer 20 or be located on the array substrate 30. When a voltage is applied to the common electrode layer 15, an electrical field is produced between the common electrode layer 15 and the pixel electrodes 33 to drive the liquid crystals in the liquid crystal layer 20 to rotate, thereby realizing a display function for the display panel 100.

The color filter includes a barrier layer 12, a color filtering layer 13, and a plurality of black matrixes 14. The color filtering layer 13 and the black matrixes 14 are formed on a surface of the barrier layer 12 adjacent to the liquid crystal layer 20.

The color filtering layer 13 includes a plurality of color filtering units, such as red filtering units (R), green filtering units (G), and blue filtering units (B). the plurality of color filtering units are separated from each other by the black matrixes 14. In at least one embodiment, each black matrix 14 is located between two adjacent color filtering units.

The barrier layer 12 includes a plurality of first portions 121 respectively corresponding with the plurality of color filtering units and a plurality of second portions 122 respectively corresponding with the plurality of black matrixes 14. Each of the color filtering units is formed on a surface of a corresponding first portion 121 adjacent to the liquid crystal layer 20. Each second portion 122 defines at least one groove 120. Each black matrix 14 includes at least one protrusion 142 received in the at least one groove 120 of a corresponding second portion 122 and a base 141 coupled with the at least one protrusion 142. The base 141 of each black matrix 14 covers the at least one protrusion 142 and a corresponding second portion 122. The at least one protrusion 142 has the same dimension (e.g., width and length) with the at least one groove 120. During manufacturing of the black matrixes 14, materials utilized to form the black matrixes 14 can be poured into the at least one groove 120 of each of the second portions 122 to form the at least one protrusion 142 of the black matrixes 14.

In at least one embodiment, each black matrixes 14 is located to correspond with a corresponding TFT 31 of the array substrate 30. Along a vertical orientation, the black matrix 14 is aligned with a corresponding TFT 31. Thus, the at least one groove 120 of the second portion 122 of the barrier layer 12 corresponds with a corresponding TFT 31.

The barrier layer 12 can be made of transparent and adhesive materials, such as transparent resins, optical clear adhesive (OCA), optical clear resins (OCR), or plastic materials. In at least one embodiment, the barrier layer 12 is a transparent film. The barrier layer 12 can be formed on the first substrate 11 by a physical vapor deposition (PVD) method or a chemical vapor deposition (CVD) method.

In the embodiment, the second portion 122 includes a bottom wall 1221 and at least two sidewalls 1222 extending from the bottom wall 1221 to the black matrix 14. The bottom wall 1221 and the at least two sidewalls 1222 corporately form the at least one groove 120. In at least one embodiment, the at least two sidewalls 1222 have the same height. A depth of the at least one groove is equal to the height of the sidewalls 1222. A sum of a thickness of the bottom wall 1221 and the height of each of the at least two sidewalls 1222 is greater than a thickness of the first portion 121 of the barrier 12. Further, the sum of a thickness of the bottom wall 1221 and the height of each of the at least two sidewalls 1222 is greater than a sum of the thickness of the first portion 121 and a thickness of the color filtering unit of the color filtering layer 13. The thickness of the bottom wall 1221 is greater than the thickness of the first portion 121 but is less than a sum of the thickness of the first portion 121 and a thickness of the color filtering unit of the color filtering layer 13. The black matrixes 14 and the color filtering units of the color filtering layer 13 are not are not arranged in a same plane. That is, a vertical distance is defined between a surface of the color filtering layer 13 adjacent to the liquid crystal layer 20 and a surface of the black matrix 14 adjacent to the liquid crystal layer 20. Thus, even if there is a minor gap between the black matrix 14 and a corresponding color filtering unit, light leakage issues at the oblique viewing angle can be greatly avoided.

Figure 2:
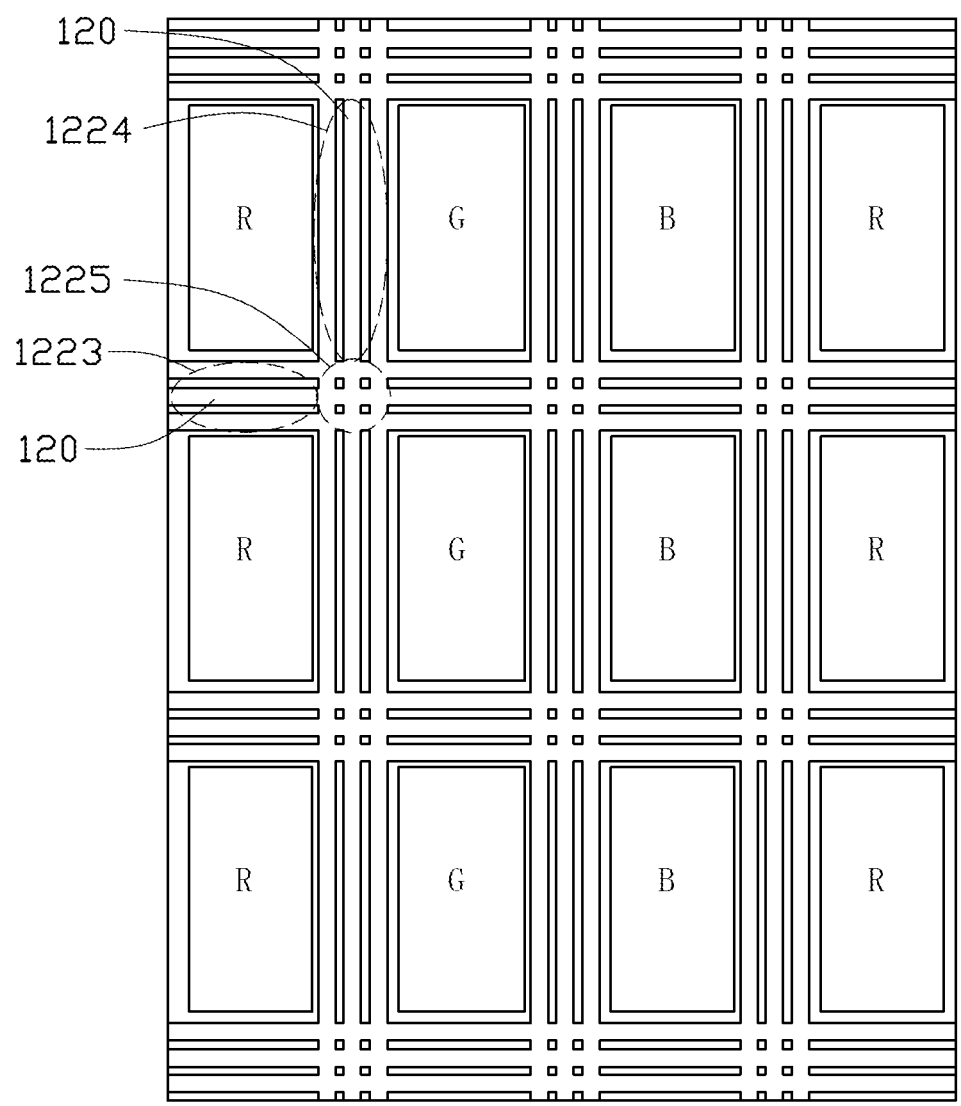
FIG. 2 illustrates a plan view of color filtering units (e.g., R, G, and B) and second portions of a barrier layer in FIG. 1 according to a first embodiment.

FIG. 2 illustrates a plan view of the color filtering units (e.g., R, G, and B) and the second portions 122 of the barrier layer 12 according to a first embodiment. Each of the second portions 122 of the barrier layer 12 is located between two adjacent color filtering units, such as between a red filtering unit (R) and a green filtering unit (G). The second portions 122 of the barrier layer 12 include a plurality of first regions 1223 arranged at a first orientation, a plurality of second regions 1224 arranged at a second orientation perpendicular to the first orientation, and a plurality of third regions 1223 respectively located at the intersections of the first regions 1223 and the second regions 1224. The first region 1223 includes at least one straight groove extending along the first orientation. The second region 1224 includes at least one straight groove extending along the second orientation. The at least one straight groove in each first region 1223 and the at least one straight groove in a corresponding second region 1224 are communicated in a corresponding third region 1225, thereby at least one groove is formed in each third region 1225. In other embodiment, the at least one straight groove in the first regions 1223 are not communicated with the at least one straight groove in the second regions 1224, and no groove is defined in the third regions 1225.

Figure 3:
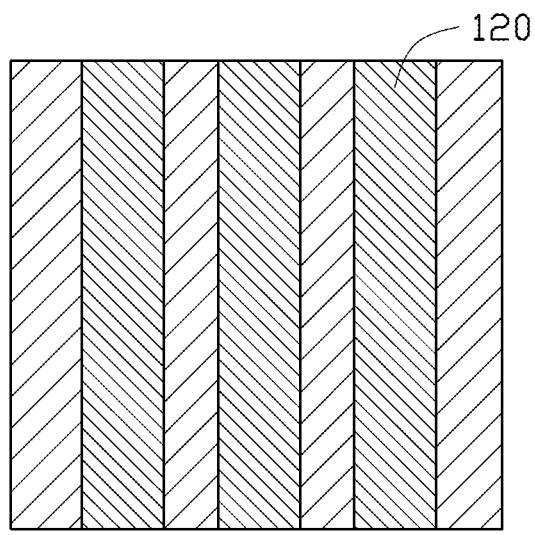
FIG. 3 illustrates an enlarged plan view of at least one groove of the second portion of FIG. 2 in a circled region II of FIG. 1 in the first embodiment.

FIG. 3 illustrates an enlarged plan view of the at least one groove 120 of the second portion 122 in a circled region II of FIG. 1 according to the first embodiment. In the first embodiment, the at least one groove 120 in the second portion of the barrier 12 includes a plurality of straight grooves which are alternately arranged in the second portion 122.

Figure 4:
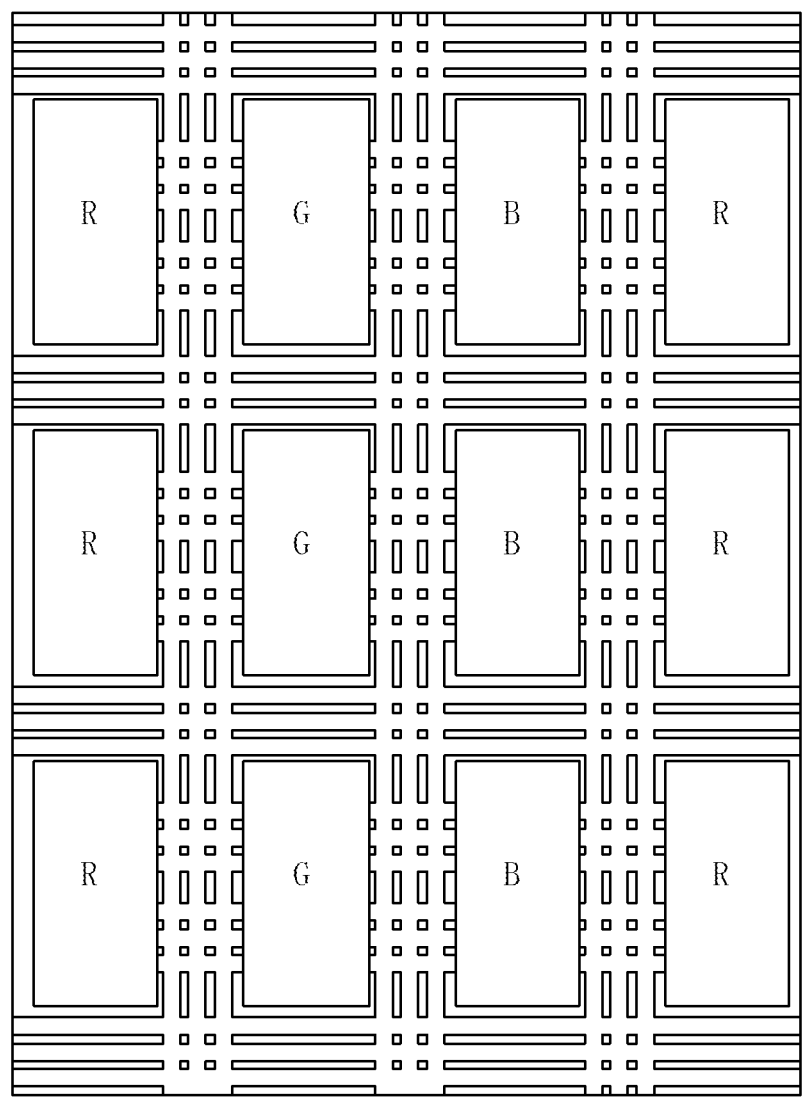
FIG. 4 illustrates a plan view of the color filtering units (e.g., R, G, and B) and the second portions of the barrier layer according to a second embodiment.
Figure 5:
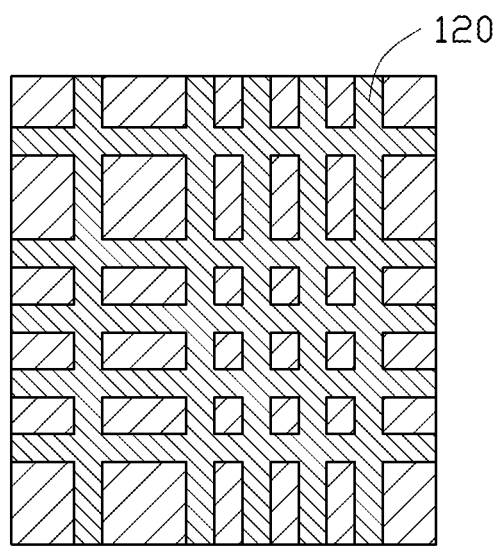
FIG. 5 illustrates an enlarged plan view of the at least one groove of the second portion in the circled region II of FIG. 1 according to the second embodiment.

FIG. 4 illustrates a plan view of the color filtering units (e.g., R, G, and B) and the second portions 122 of the barrier layer 12 according to a second embodiment. The second embodiment is similar to the first embodiment, except that the at least one groove 120 in the second region 1224 includes at least one first straight groove extending a long a first direction and at least one second straight groove extending along a second direction perpendicular to the first direction. The at least one first straight groove and the at least one second straight groove are intersected with each other. For example, FIG. 5 illustrates an enlarged plan view of the at least one groove 120 of the second portion 122 in the circled region II of FIG. 1 according to the second embodiment. The at least one groove 120 in the second portion 122 can include a plurality of first straight grooves and a plurality of second straight grooves perpendicular to the first straight grooves.

Figure 6:
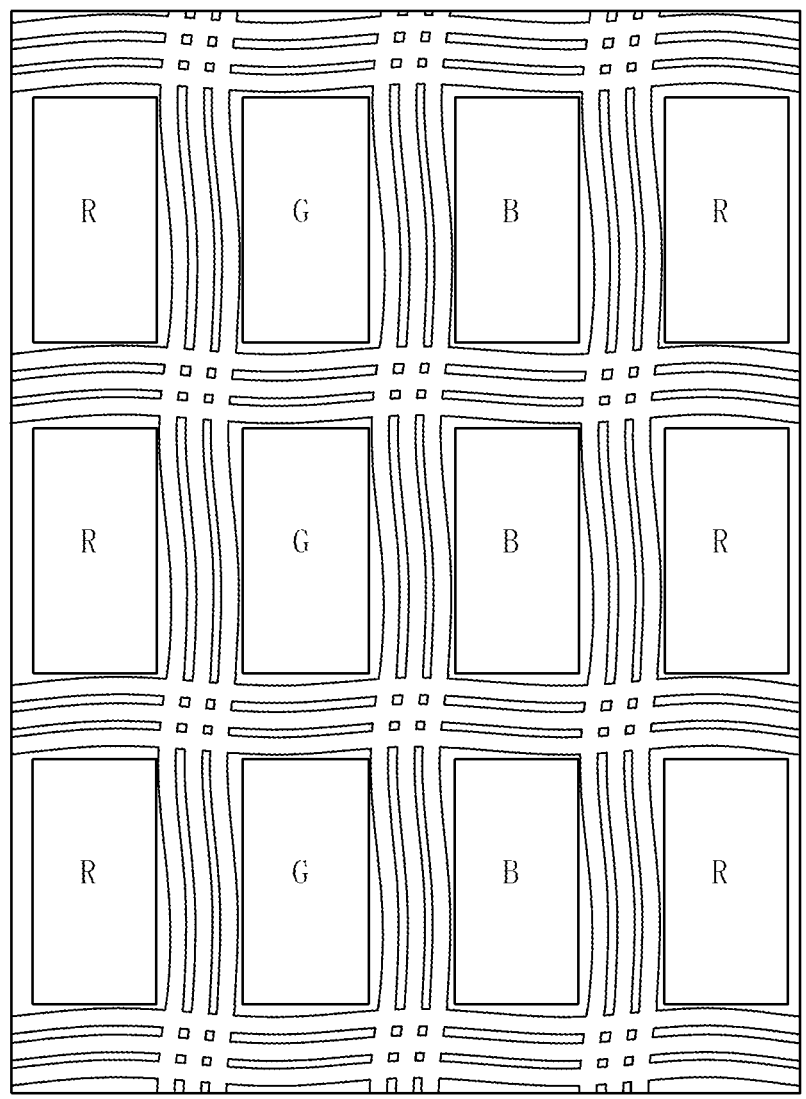
FIG. 6 illustrates a plan view of the color filtering units (e.g., R, G, and B) and the second portions of the barrier layer according to a third embodiment.
Figure 7:
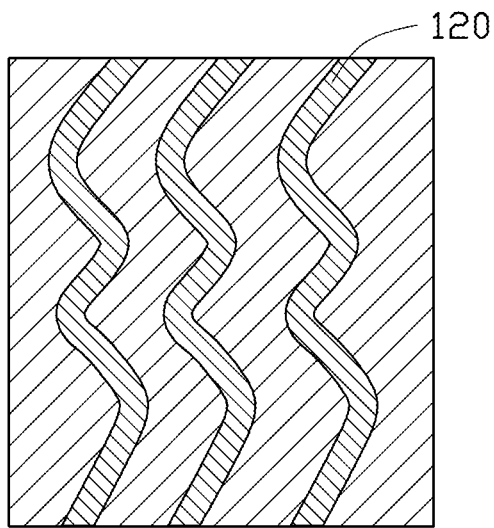
FIG. 7 illustrates an enlarged plan view of the at least one groove of the second portion in the circled region II of FIG. 1 according to the third embodiment.

Referring to FIG. 6 and FIG. 7, FIG. 6 illustrates a plan view of the color filtering units (e.g., R, G, and B) and the second portions 122 of the barrier layer 12 according to a third embodiment, FIG. 7 illustrates an enlarged plan view of the at least one groove 120 of the second portion 122 in the circled region II of FIG. 1 according to the third embodiment. The third embodiment is similar to the first embodiment, except that the first region 1223 and the second region 1224 respectively include at least one curving groove. The at least one curve groove in each first region 1223 communicate with the at least one curving groove in a corresponding second region 1224 in a corresponding third region 1225, thereby at least one curve groove is formed in each third region 1225. As shown in FIG. 7, the second portion 122 includes a plurality curving grooves which are alternately arranged.

Figure 8:
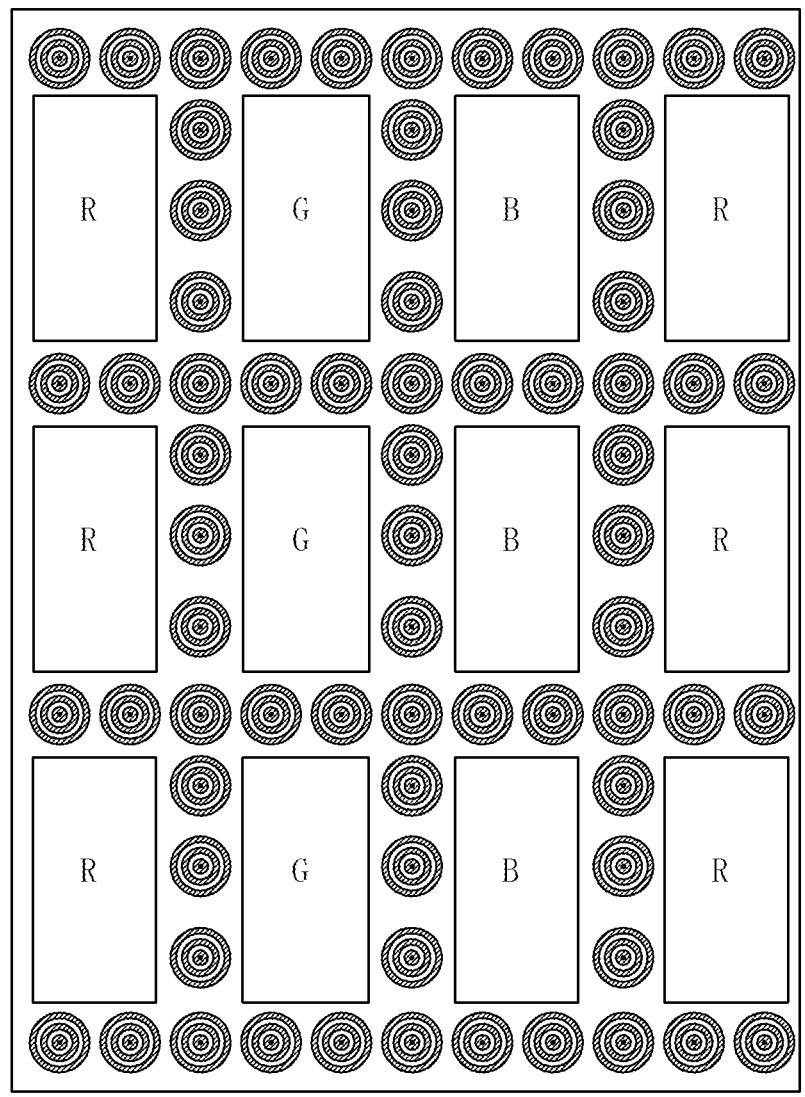
FIG. 8 illustrates a plan view of the color filtering units (e.g., R, G, and B) and the second portions of the barrier layer according to a fourth embodiment.
Figure 9:
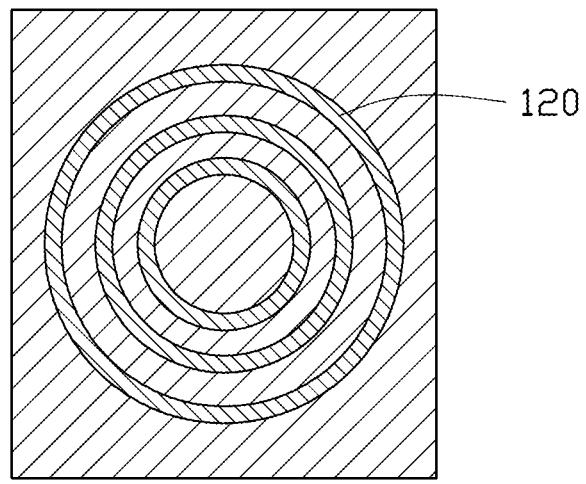
FIG. 9 illustrates an enlarged plan view of the at least one groove of the second portion in the circled region II of FIG. 1 according to the fourth embodiment.

Referring to FIG. 8 and FIG. 9, FIG. 8 illustrates a plan view of the color filtering units (e.g., R, G, and B) and the second portions 122 of the barrier layer 12 according to a fourth embodiment, FIG. 9 illustrates an enlarged plan view of the at least one groove 120 of the second portion 122 in the circled region II of FIG. 1 according to the fourth embodiment. The fourth embodiment is similar to the first embodiment, except that the first region 1223, the second region 1224, and the third region 1225 respectively include at least one annular groove. For example, as shown in FIG. 7, the second portion 122 of the barrier layer 12 includes at least one circular groove. In other embodiment, the second portion 122 can include at least elliptic groove and/or at least one quadrate groove.

Figure 10:
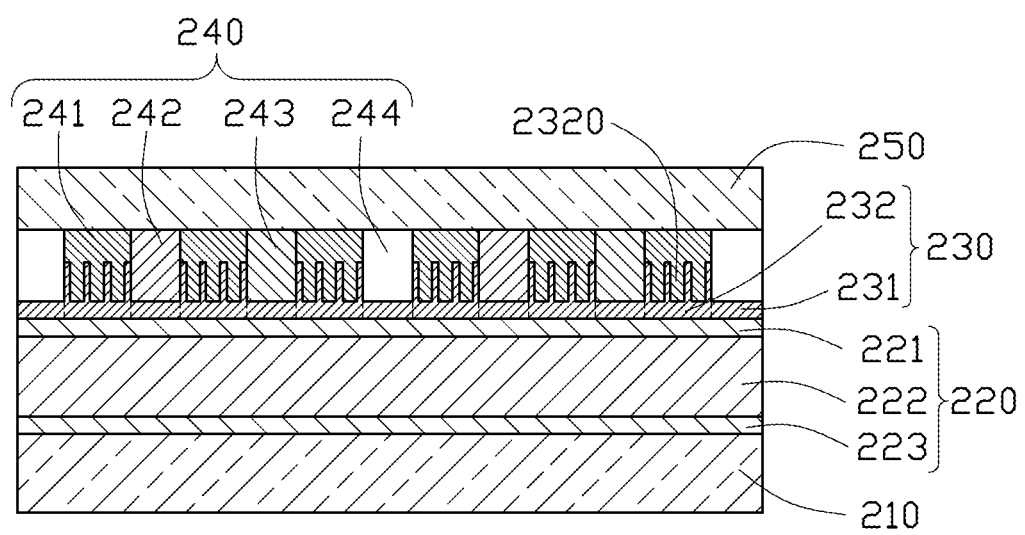
FIG. 10 illustrates a cross-sectional view of another display panel different from the display panel of FIG. 1.

The above mentioned barrier layer 12 can be also utilized in an organic light emitting diode (OLED) display panel to avoid color mixture issues. For example, FIG. 10 illustrates a display panel 200 which is an OLED display panel. The display panel 200 can include an array substrate 210, a light emitting layer 220 located on the array substrate 210, a barrier layer 230 located at a light output side of the light emitting layer 220, a color conversion layer 240 located on a surface of the barrier layer 230 away from the array substrate 210, and flat layer 250 covering the color conversion layer 240.

The lighting emitting layer 220 can include a first electrode 221, a second electrode 223, and a light emitting material layer 222 sandwiched between the first electrode 221 and the second electrode 222. The light emitting material layer 222 is electrically coupled to the array substrate 210 via the second electrode 223. In at least one embodiment, the first electrode 221 and the second electrode 223 respectively are an anode and a cathode which are made of transparent conductive materials, such as indium tin oxide (ITO).

The color conversion layer 240 includes a plurality of black matrixes 241 and a plurality of color conversion units. In this embodiment, the plurality of color conversion units include a plurality of first color conversion units 242, a plurality of second color conversion units 243, and a plurality of third color conversion units 244. Each black matrix 241 is located between two adjacent color conversion units.

In at least one embodiment, the first color conversion units 242 are configured to emit red light, the second color conversion units 243 are configured to emit green light, and the second color conversion units 244 are configured to emit blue light, to realize a full color display function for the display panel 200.

The barrier layer 230 is similar to the barrier layer 12 of the display panel 100 in the first embodiment. In at least one embodiment, the barrier layer 230 includes a plurality of first portions 231 respectively corresponding with the plurality of color conversion units and a plurality of second portions 232 respectively corresponding with the plurality of black matrixes 241. Each of the color conversion units is formed on a surface of a corresponding first portion 231 away from the light emitting layer 220. Each second portion 232 defines at least one groove 2320. Each black matrix 241 includes at least one protrusion received in the at least one groove 2320 of a corresponding second portion 232 and a base coupled with the at least one protrusion. In this embodiment, the first portion 213, the second portion 232, and the at least one groove 2320 are respectively the same as the first portion 121, the second portion 122, and the at least one groove 120 in FIG. 1, detailed descriptions thereof are omitted.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A color filter substrate comprising:
a substrate;
a barrier layer coupled to the substrate;
a plurality of color filtering units coupled to the substrate; and
a plurality of black matrixes coupled to the barrier layer;
wherein the barrier layer comprises a plurality of first portions respectively corresponding with the plurality of color filtering units and a plurality of second portions respectively corresponding with the plurality of black matrixes, each of the plurality of second portions defines at least one groove, and each of the plurality of black matrixes comprises at least one protrusion received in the at least one groove of a corresponding second portion and a base coupled to the at least one protrusion;
wherein the at least one groove comprises at least one first straight groove extending along a first direction and at least one second straight groove extending along a second direction perpendicular to the first direction.

2. The color filter substrate according to claim 1, wherein each of the plurality of second portions comprises a bottom wall and at least two sidewalls extending from the bottom wall to a corresponding black matrix, the bottom wall and the at least two sidewalls cooperatively form the at least one groove.

3. The color filter substrate according to claim 2, wherein a sum of a thickness of the bottom wall and a height of the sidewall is greater than a thickness of the first portion of the barrier layer.

4. The color filter substrate according to claim 2, wherein a sum of a thickness of the bottom wall and a height of each of the sidewall is greater than a sum of a thickness of the first portion and a thickness of a color filtering unit.

5. The color filter substrate according to claim 2, wherein a thickness of the bottom wall is greater than a thickness of the first portion but is less than a sum of the thickness of the first portion and a thickness of the color filtering unit of the color filtering layer.

6. The color filter substrate according to claim 1, wherein the barrier layer is made of transparent and adhesive materials.

7. The color filter substrate according to claim 1, wherein the barrier layer is a film.

8. The color filter substrate according to claim 1, wherein the second portions of the barrier layer include a plurality of first regions arranged at a first orientation, a plurality of second regions arranged at a second orientation perpendicular to the first orientation, and a plurality of third regions respectively located at the intersections of the first regions and the second regions; the first region comprises the at least one first straight groove and the second region comprises the at least one second straight groove; the at least one straight first groove in each first region communicates with the at least one second straight groove in a corresponding second region.

9. The color filter substrate according to claim 1, wherein the at least one groove is straight, curve, or annular.

10. A display panel comprising:
a color filter substrate, an array substrate, and a liquid crystal layer located between the color filter substrate and the array substrate, the color filter substrate comprising:
a substrate;
a barrier layer coupled to the substrate; and a plurality of color filtering units and a plurality of black matrixes coupled to the barrier layer;

wherein the barrier layer comprises a plurality of first portions respectively corresponding with the plurality of color filtering units and a plurality of second portions respectively corresponding with the plurality of black matrixes, each of the plurality of second portions defines at least one groove, and each of the plurality of black matrixes comprises at least one protrusion received in the at least one groove of a corresponding second portion and a base coupled to the at least one protrusion.

11. The display panel according to claim 10, wherein each of the plurality of second portions comprises a bottom wall and at least two sidewalls extending from the bottom wall to a corresponding black matrix, the bottom wall and the at least two sidewalls cooperatively form the at least one groove.

12. The display panel according to claim 11, wherein a sum of a thickness of the bottom wall and a height of the sidewall is greater than a thickness of the first portion of the barrier layer.

13. The display panel according to claim 11, wherein a sum of a thickness of the bottom wall and a height of the sidewall is greater than a sum of a thickness of the first portion and a thickness of a color filtering unit.

14. The display panel according to claim 10, wherein the barrier layer is made of transparent and adhesive materials.

15. The display panel according to claim 10, wherein the barrier layer is a film.

16. A display panel comprising:
an array substrate;
a light emitting layer located on the array substrate;
a barrier layer located at a light output side of the light emitting layer; and
a color conversion layer located on a surface of the barrier layer away from the array substrate, the color conversion layer comprising a plurality of black matrixes and a plurality of color conversion units;
wherein the barrier layer comprises a plurality of first portions respectively corresponding with the plurality of color conversion units and a plurality of second portions respectively corresponding with the plurality of black matrixes; each of the color conversion units is formed on a surface of a corresponding first portion away from the light emitting layer; each of the plurality of second portions defines at least one groove; each of the plurality of black matrixes comprises at least one protrusion received in the at least one groove of a corresponding second portion and a base coupled to the at least one protrusion.

17. The display panel according to claim 16, wherein the light emitting layer comprises a first electrode, a second electrode, and a light emitting material layer sandwiched between the first electrode and the second electrode.

18. The display panel according to claim 16, wherein each of the plurality of second portions comprises a bottom wall and at least two sidewalls extending from the bottom wall to a corresponding black matrix, the bottom wall and the at least two sidewalls cooperatively form the at least one groove; a sum of a thickness of the bottom wall and a height of the sidewall is greater than a thickness of the first portion of the barrier.

19. The display panel according to claim 16, wherein the barrier is made of transparent and adhesive materials.

20. A color filter substrate comprising:
a substrate;
a barrier layer on the substrate;
a plurality of color filtering units coupled to the barrier layer; and
a plurality of black matrixes coupled to the barrier layer;
wherein the barrier layer comprises a plurality of first portions and a second portion surrounding the plurality of first portions, each of the plurality of first portions corresponds to one of the plurality of color filtering units, the second portion corresponds to the plurality of black matrixes, the second portion defines at least one groove, and each of the plurality of black matrixes comprises at least one protrusion received in the at least one groove of the second portion and a base coupled to the at least one protrusion;
wherein the second portion comprises a plurality of first regions arranged at a first orientation and a plurality of second regions arranged at a second orientation perpendicular to the first orientation; the first region comprises at least one straight groove extending along the first orientation and the second region comprises at least one straight groove extending along the second orientation.

* * * * *